Oct. 5, 1937.  O. HAAR  2,095,193
EYE PROTECTING DEVICE
Filed Jan. 2, 1935
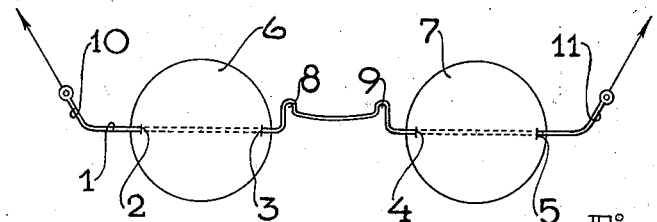
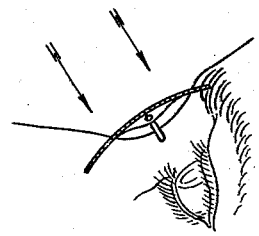
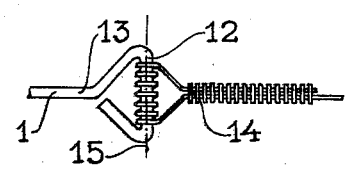
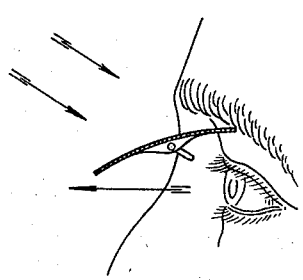
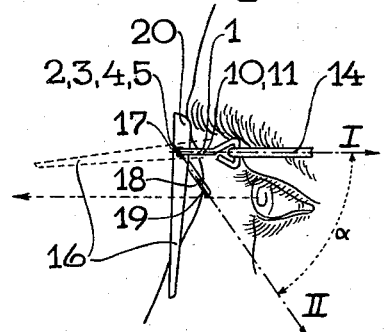
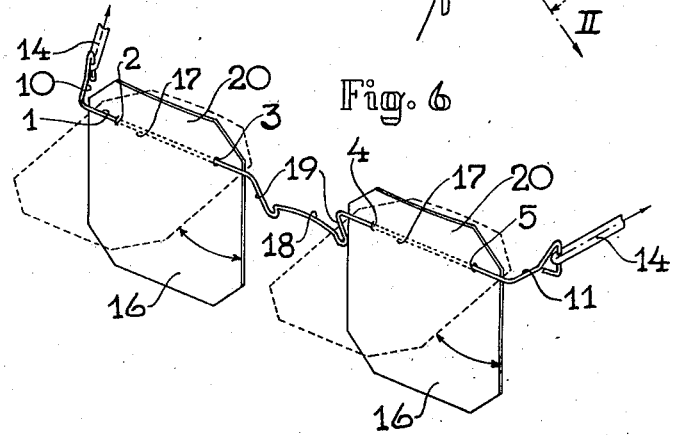

Patented Oct. 5, 1937

2,095,193

UNITED STATES PATENT OFFICE 2,095,193

EYE PROTECTING DEVICE

Otto Haar, Vienna, Austria

Application January 2, 1935, Serial No. 92
In Austria January 16, 1934

7 Claims. (Cl. 2—12)

This invention relates to eye-protecting devices, and has for its main object to provide combined light-subduing goggles and anti-dazzle eye shades in spectacle form. A further object of the invention is to provide a device of this nature which lends itself to easy and inexpensive manufacturing on mass production lines. A further object of the invention is to provide a device of this nature which is of extremely light weight and at the same time not liable to become broken or damaged in use. A still further object of the invention is to ensure unobstructed view at all times with a device of the nature indicated.

With these and other objects in view the invention consists essentially in the provision of a spectacle frame having horizontal supporting elements between the side members and the nose piece and in combination therewith tiltable eye protecting elements pivoted upon the said supporting elements about axes substantially in alinement with each other and lying within the contour of the said eye protecting elements. By virtue of this latter feature the eye protecting elements (which are also referred to hereinafter as "glasses", for the sake of simplicity, although glass is not contemplated as a material therefor) are enabled, in contrast to other known types of spectacles using glasses pivoted about an axis lying without the contour of the glass, when tilted up, to serve effectually as an eye shade, since the gap between the horizontal front frame members and the eyebrow region, through which dazzling light would otherwise fall, is then completely covered over by the suitably proportioned part of the glasses lying above the pivot axis in the vertical position of the glasses.

The invention further provides for the mounting of the glasses with sufficient friction to ensure their remaining in any set position. This can be most simply effected by using resilient material for the glasses and passing the horizontal supporting frame members, which in this case are of round section, through suitable holes or slits in the glasses. The glasses thereby become curved (it being preferable to arrange for the curvature to be concave towards the eye in the vertical position of the glasses), the necessary friction being produced by the inherent resilience of the glasses. In this connection it is also possible to provide pivot holes in the glasses with intervening slits, so that the glasses can be removed and replaced when the spectacles are in the finished state.

Although the above-described is the preferred arrangement, it is perfectly possible to mount the glasses in the specified manner with the aid of separate hinge elements secured to the glasses or in any other suitable or convenient manner. The essential feature relative to the mounting of the tiltable glasses is, as pointed out above, that the pivot axes lie within the contour of the glasses substantially in alinement with each other.

In order to ensure unobstructed view through the glasses (when the device is used as goggles) as also past and beneath the glasses (when the device is used as an anti-dazzle eye shade) the horizontal supporting frame member on which the glasses are mounted is raised above the axis of vision by the arrangement that the connecting parts between the said horizontal member and the nose piece of the frame are at a considerable angle to the horizontal.

The material of which the glasses are made is preferably of a resilient and non-fragile nature and readily capable of dyeing to provide the required degree of opacity or light-subduing effect.

The side members of the frame may be of any type usual for spectacles, and are suitably articulated to the horizontal supporting member. When the glasses are mounted by being threaded on the supporting members in the manner indicated above, the outer ends of the supporting member are preferably subsequently bent to form one half of the hinge between the front and side members of the frame.

A form of construction embodying the invention is shown by way of example in the accompanying drawing, in which:

Fig. 1 shows in front elevation a combined eye protecting device in accordance with the invention.

Fig. 2 illustrates the articulate connection between the front and side members of the frame.

Figs. 3 and 4 show the respective settings of the eye protecting elements to serve as goggles and as shades.

Fig. 5 shows the manner in which the front supporting member and the nose piece of the spectacles frame are constructed to ensure unobstructed view.

Fig. 6 is a perspective view of the form of the eye protecting device according to the invention shown in Fig. 5.

Referring to Fig. 1, the eye protecting members or glasses 6, 7, made of resilient and suitably coloured material, such as celluloid, cellon, or the like, are perforated as at 2, 3, and 4, 5, respectively, and threaded on to the front supporting member 1 of the frame so that the pivot axis lies in each case within the contour of the glass.

At the same time the eye protecting elements become curved or buckled so that their inherent resilience will produce sufficient friction against the supporting member to ensure the fixation of these elements in any position in which they may be set. The glasses are threaded on, that is to say the front member passed through, preferably in such a manner that the curvature of the protecting elements is concave towards the eye of the wearer. The glasses may also be slit between the perforations, as along the dotted lines in Fig. 1, to permit of the ready removal and re-fitting of these glasses after the frame has been bent up into its final shape.

The front supporting member 1 of the frame is kinked as at 8 and 9 to check lateral displacement of the glasses and to form the nose piece of the frame. The outer ends of the front member 1 are bent over to form end portions 10, 11 in order to provide the necessary stability against rotation of the supporting member 1. To the side portions 10 and 11 the side members 14 of the frame are articulated in any suitable manner.

Fig. 2 shows a preferred form of articulated joint between the end of the front supporting member 1 and the side member or ear piece 14 of the frame. In this form the member 1, which is of uniform cross-section throughout to facilitate the mounting of the eye protecting element during manufacture, is subsequently bent or looped to form one half of a hinge joint to the side member 14, as shown.

Figs. 3 and 4 illustrate the manner in which the glasses can be tilted, when the device is worn, to serve either as goggles or as eye shades.

I have found that it is desirable to bring the pivot axis out of the axis of vision so as to ensure unobstructed view in all positions of the glasses. This result is preferably achieved, as shown in Fig. 5, by bending up the front supporting member 1 of the frame in such a manner that, when viewed in end elevation, the parts 18 and 19, which are situated between the pivot portions and the kinked portions 8, 9 bounding the nose piece, form a considerable angle ($\alpha$) with the end portions 10, 11 and the side members 14 which are normally approximately horizontal in the position of use. In this case the eye protecting element is not symmetrically pivoted, the part above the pivot axis being smaller than that below, in the vertical position. This is however of no disadvantage, since by the described construction of the front supporting member of the frame the eye protecting members are brought nearer to the face, so that the portion of the glasses above the pivot axis is still capable of covering over the gap between the pivot axis and the region of the eyebrows through which light would otherwise fall when the glasses are tilted up to serve as shades.

What I claim is:

1. An eye protecting device in spectacle form comprising in combination a spectacle frame having substantially horizontal, alined, straight, front supporting members, two independent eye protecting elements made from light-dimming sheet material frictionally mounted in spaced relation on the said supporting members for individual pivotal movement about axes which are substantially horizontal and in alinement with each other, and which lie within the contour of the said elements.

2. An eye protecting device in spectacle form comprising in combination a spectacle frame having substantially horizontal, alined, front supporting members, two independent eye protecting elements made from light-dimming resiliently flexible sheet material each having two perforations in spaced relation, the said elements being threaded, severally, on the said supporting members by means of the said perforations so that the said elements are arched and frictionally mounted on the said members by virtue of their inherent resilience.

3. An eye protecting device as claimed in claim 2 in which each of the said elements is provided with a slit extending from one to the other of the said perforations, for the purpose of facilitating removal and replacement of the said elements.

4. An eye protecting device in spectacle form comprising a substantially horizontal front frame member having its middle portion provided with a nose piece, off-set bent end portions disposed substantially horizontally in the position of use, and rectilinear supporting members between said middle and end portions, and two independent eye protecting elements made from light-dimming sheet material frictionally mounted on the said supporting members for pivotal movement about axes which are substantially horizontal and in alinement with each other, and which lie within the contour of the said elements, the said nose piece extending in a plane disposed at an angle to the plane of the said bent end portions and ear pieces, whereby the said supporting members lie above the normal direction of the line of sight of the eyes of the wearer and the tension of the said ear pieces tends to increase the stability of the said frame on the nose of the wearer.

5. As a new article of manufacture, eye shield spectacles comprising a frame having a nose piece and eye shield members mounted on the said frame at opposite sides of said nose piece, said members being composed of transparent and resilient material, each of said members having spaced apertures through which said frame extends, the portions of said frame extending between the spaced apertures in said members, respectively, being straight, and the members being biased into and held in a concavo-convex condition by said portions of the frame, thereby producing frictional engagement of the shields on the frame.

6. As a new article of manufacture, eye shield spectacles comprising a frame composed of a length of wire, and separate eye shield members pivotally mounted on said wire, said eye shield members being composed of resilient material, each of said eye shield members having a pair of spaced apertures extending therethrough, and said wire extending through said apertures, the portions of said wire which extend between said spaced apertures in said members, respectively, being straight, and the members being biased into and held in a concavo-convex condition by said portions of the wire, thereby producing frictional engagement of the shields on the wire.

7. As a new article of manufacture, eye shield spectacles comprising a frame composed of a length of wire provided with an integral nose piece, and separate eye shield members pivotally mounted on said wire, on opposite sides of said nose piece, said eye shield members being composed of transparent and resilient material, each of said eye shield members having a pair of spaced apertures extending therethrough from one surface to the other, the portions of said wire extending between the spaced apertures in said members, respectively, being straight, and the members being biased into and held in a concavo-convex condition by said portions of the wire, thereby producing frictional engagement of the shields on the wire.

OTTO HAAR.